Oct. 20, 1936.     N. G. BEGLE     2,058,207
MACHINE FOR MAKING MATCH SPLINTS AND SIMILAR ARTICLES
Filed July 24, 1934     7 Sheets-Sheet 1

Oct. 20, 1936.  N. G. BEGLE  2,058,207
MACHINE FOR MAKING MATCH SPLINTS AND SIMILAR ARTICLES
Filed July 24, 1934  7 Sheets-Sheet 6

INVENTOR
Ned G. Begle
BY
Charles G. Hensley
ATTORNEY

Oct. 20, 1936.   N. G. BEGLE   2,058,207
MACHINE FOR MAKING MATCH SPLINTS AND SIMILAR ARTICLES
Filed July 24, 1934   7 Sheets-Sheet 7

INVENTOR
Ned G. Begle
BY
Charles G. Hensley
ATTORNEY

Patented Oct. 20, 1936

2,058,207

UNITED STATES PATENT OFFICE 2,058,207

MACHINE FOR MAKING MATCH SPLINTS AND SIMILAR ARTICLES

Ned G. Begle, Greenwich, Conn., assignor to Berst-Forster Dixfield Co., New York, N. Y., a corporation Application July 24, 1934, Serial No. 736,626

12 Claims. (Cl. 144—50)

My invention relates to a machine for making match splints. Heretofore, wood match splints have been produced under two general methods. One of these was to produce from logs strips of veneer of the thickness of the match splints, and this veneer was chopped off and cut into pieces about the same width as the thickness of the veneer to reduce the pieces to match splints of square cross section.

The other method is to make substantially round splints by taking a block of wood corresponding in thickness to the length of the match splints and this block is cut by means of a die having circular cutting members which simultaneously cut a plurality or a row of splints from one edge of the block of wood. This method not only left a substantial flat on one side of the splints but there was considerable waste of stock.

The object of my invention is to produce match splints which will be circular or nearly circular in cross section in order that they may be packed conveniently without entanglement, in the small boxes or cartons in which they are sold. In the present machine splints may be made much superior in appearance to the splints made under the second method described above. Furthermore, the splints made with the present machine are superior because the wood is not torn, twisted and strained and there are no loose or rough fibres on the splints so that there is less likelihood of a person using matches made with the present machine, getting splinters in the fingers.

Furthermore, as the wood is not put under great stresses and strains, there is less likelihood of the splints breaking when the matches from which they are made are struck.

With the present machine the splints are first produced of square cross section by being chopped from sheets of veneer and they are then converted into round or rounded splints in the present machine. With the present machine if the splints should warp after they have been chopped from the veneer and before they are fed into the present machine to be reduced to the rounded state, that is to say, if the splints are bent out of the straight line they will not clog the machine, nor will they be destroyed themselves, but instead will be rounded the same as the splints which remain perfectly straight.

While various attempts have been made to reduce splints of square cross section to rounded shape by different methods, such as by driving the splints lengthwise through dies acting by pressure to reduce the square splints to the rounded form, these attempts have been either failures or only partially successful. With the present machine the splints are reduced to the rounded condition by rolling pressure acting progressively from one end to the other of a splint, the rollers which round the splints also serving to propel them through the openings between the rolling members as distinguished from an endwise driving force for driving the splints through stationary dies. This rolling action avoids breakage of the splints whether they be exactly straight when introduced into the dies, or if they have become slightly warped or distorted, so that there is no likelihood of the machine being jammed by inaccurate splints. I believe my invention is broadly new in that rolling die members act locally and progressively along the splints to both propel them and reduce them to rounded shape. Furthermore, the wood of the splints is not torn, twisted, nor strained.

The present machine is very rapid in its operation so that it has a high production or output. In the preferred form of the invention the rolling dies simultaneously press two of the angular edges of the splint disposed diagonally opposite each other and at the same time compress and simultaneously cut the other two angular edges of the splint in order to remove any excess of material remaining from the compression operation.

It would be difficult to remove all four edges of the splints by cutting action and yet it is desirable that there be some cutting action to remove excess material in order to avoid burrs, slivers and the like. With the type of roller dies described herein I am enabled to apply both the compression and cutting actions to the splints.

The machine is automatic in its operation; that is to say, the splints feed automatically from a hopper so that they come singly into position to be moved longitudinally into the bight of the dies by a feed roller which propels the match splints to remove them from the stack in the hopper and to advance them towards the rolling dies. There are supports having annular pockets into which the splints are fed by the propelling roller and when the splints fall into these pockets they assume definite positions and retain these positions until they begin to feed into the bight of the roller dies.

In the preferred form of the invention the dies have a large number of grooves, so that a great many splints may be propelled by them at the same time and the machine thus has a large output. Other advantages will be set forth in the following description of my invention.

In the drawings forming part of this application.

The frame 2 of the machine is shown mounted upon a base 1 which is adapted to rest upon a floor or other support. The principal parts of the frame consist of end standards 3 which are tied together by longitudinal bolts 4. The frame is provided with various bearings and brackets to support the working parts in the relation hereinafter described. A quantity of splints of square cross section, previously formed by chopping sheets of veneer into individual pieces corresponding in length with the match splints, and of such thickness in the two directions that when reduced to rounded condition they will be suitable for match splints, assuming of course that the machine is to be used for making match splints, are supplied to the machine. If splints are to be used for making other articles the square section splints may be of different size to that shown in the drawings, but the operation of the machine will be the same as for producing match splints.

These splints of square cross section are fed in bulk, or in large quantity, into the upper end of the hopper 5 which is mounted at the top of the machine upon a sliding base to be hereinafter referred to. The splints are positioned in the hopper so that they point to the front and rear of the machine or at right angles to the revolvable dies. Within the hopper I have provided partitions 6 which serve to divide off the splints into a number of individual groups or bodies so that they travel downwardly in the several compartments 7 within the hopper toward the feeding roller. The dividing walls 6 have a tendency to prevent the splints from turning crosswise in the hopper and to prevent them from otherwise entangling.

It may be stated at this point that the hopper is vibrated laterally of the machine by mechanism hereinafter described, for the purpose of agitating the splints and causing them to travel downwardly in the hopper toward the lines of discharge.

It will be understood that the machine may be in a simple form to propel splints singly through dies having but one reforming pocket, but as such a machine will have a very small output, I prefer to simultaneously propel a considerable number of rows of splints through the machine; and in the machine which I have constructed the dies which are divided in half lengthwise to accommodate an intermediate bearing, are provided with a total of forty-eight channels on each side of the intermediate bearings, making a total of ninety-six channels for the splints to travel through at one time. While I have shown this number in the drawings, it will be understood that the number of channels may be greater or less than the number disclosed herein without departing from the scope of my invention. Each row of splints is handled by the machine in the same manner so that the description applies equally to any row of splints.

There is a sort of reticulated frame built up of flat pieces bolted together into which the splints feed from the bottom of the hopper, and this frame is shown in Figures 9 to 12 inclusive as assembled from flat plates, as follows: At the front of the bottom end of the hopper there are arranged a number of plates 8 disposed in vertical and parallel planes, which are clamped together by means of a rod 9 extending through registering apertures in the several plates, this rod being mounted rigidly in the frame of the machine at each end. At the rear side of the hopper there are other plates 10 assembled to lie in spaced vertical planes and to lie in the same planes with the plates 8 just described.

The plates 10 are also assembled upon a rod 11 which extends through registering apertures in the several plates and this rod, like the rod 9 is also secured at each end in the frame of the machine.

Figure 11:
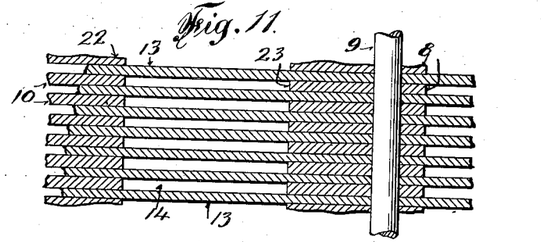
Figure 11 is a sectional view taken on the line 11—11 of Figure 9.
Figure 12:
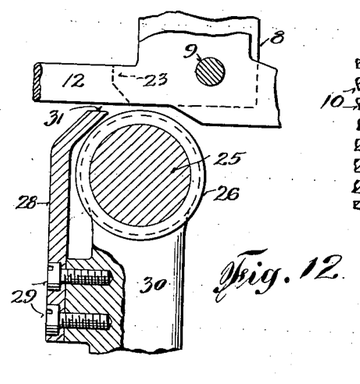
Figure 12 is an enlarged detail view showing the propelling roller and the guide for controlling the movement of the splints toward the propelling roller.

There is a third set of plates 12 also mounted upon the bars 9 and 11 and they also lie in parallel vertical planes and are interposed between the individual plates 8 and individual plates 10 as shown in Figure 11. The plates 8 and 10 do not extend across the space under the hopper but the plates 12 have a shallow portion 13 which does extend across the bottom of the hopper and at this location the plates 12 are spaced slightly further apart than the thickness of the square splints which are supplied in the hopper, so that the hopper feeds the splints through the various vertical slots 14 formed between the plates 12. In the machine illustrated there are ninety-six of these slots disposed in parallel relation below the hopper, so that there will be ninety-six rows of splints fed from the machine continuously with the splints in each row moving in successive relation.

Figure 9:
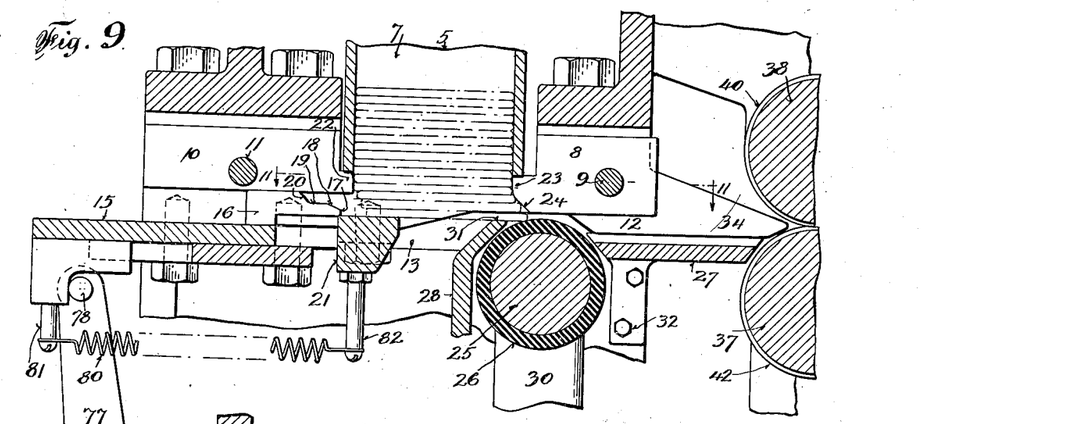
Figure 9 is a sectional view showing part of the hopper, feed roller, and associated parts.
Figure 10:
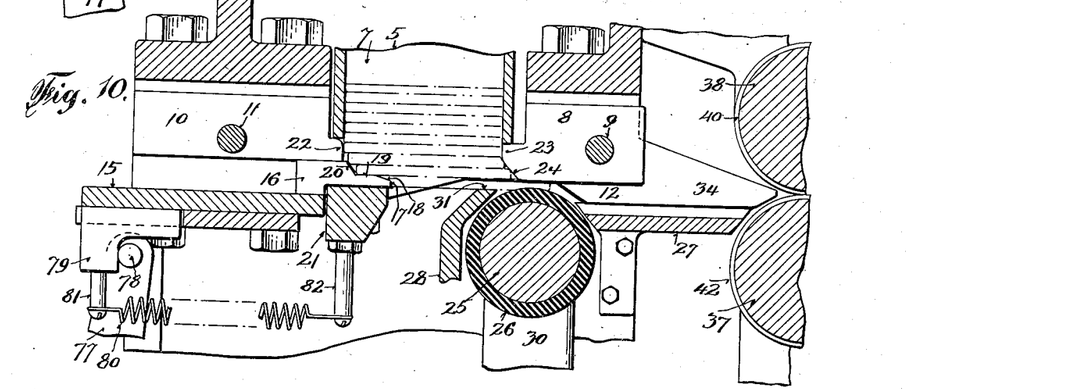
Figure 10 is a similar view showing one of the drivers moved forwardly to advance the splints into the bight of the propelling roller.

Below the plates 12 and extending crosswise of the machine, I have shown a sliding plate bar 15 which is adapted to be reciprocated from right to left as shown in Figures 9 and 10 by the operating device to be described hereinafter. In fact, I have provided two such sliding bars, both of which are alike, and lie in the same horizontal plane, each one acting as a driver over one-half the width of the machine. I prefer to divide the action up between the two sliding bars and drivers instead of one, although it will be understood that a single driver may be used, if desired.

Each of these driving bars is provided with a number of upstanding driving members 16 which are disposed in spaced parallel, vertical planes, there being one driving member for each slot 14 between the plates 12 and in line therewith.

These drivers may be formed integral with the driving bars 15 as shown in the drawings, or they may be separately formed and mounted thereon. The forward ends of these driving members have an abutment portion 17 corresponding in dimensions with the end of one of the square match splints. This is followed by a slanting surface 18 and the latter is followed by a flat surface 19 which is spaced above the top of the abutment end 17 about the thickness of one match splint. From the flat surface 19 there rises a slanting edge 20 on the drivers which terminates at the top surface of the drivers at a vertical height above the surface 19 which is equal to the thickness of one of the square splints.

I have shown a beam 21 extending crosswise of the machine partly below the hopper and the forward ends of the drivers 16 rest upon and are guided by this beam when they reciprocate back and forth with the bar 15 on which the drivers are mounted.

The plates 10 have projecting portions 22 which extend under the bottom edge of the rear plate of the hopper and these extensions serve to guide the splints and prevent them from moving lengthwise to the left in Figure 9. It will be recalled that the hopper reciprocates sidewise of the machine and the extensions 22, which are stationary, continue to guide the splints as they move below the bottom edge of the hopper. The plates 8 also have extensions 23 which extend under the bottom edge of the front plate of the hopper and which also serve to prevent the splints from moving to the right in Figure 9, except when they reach their lowermost position.

The rear edge of the extension 23 is chamfered or slanted as shown at 24 to permit the lowermost splints to move into echelon position, as shown in Figures 9 and 10, and they are moved into this position by the forward ends of the drivers 16.

There is a roller 25 disposed below the forward ends of the plates 8, 12 which serves as a propelling member to drive the splints onto the positioning table. This roller is preferably rubber covered, as shown at 26 in order to create sufficient friction to drive the rows of splints and also to conform to slight irregularities thereof. The right hand ends of the lowermost splints in Figure 9 are propelled by the drivers 16 into the bight formed between the top of the propelling roller and the bottom edges of the plates 8 and as this roller is driven clockwise in Figures 9 and 10 by mechanism to be described, it co-operates with the bottom edges of these plates to propel the splints to the right in Figures 9 and 10, thereby propelling them one at a time in each row onto the positioning table 27 disposed at the right of the feed roller in Figures 9 and 10.

The left hand end of the bottom splint rests on the beam 21 until it is driven off by the driver. In order to prevent the right hand end of the bottom splints dropping too far down on the surface of the propelling roller 25 I provide a supporting plate 28 which is mounted by screws 29 on the post 30. The upper end of this plate extends to the right to a position close to the bight of the roller 25; and its top surface 31 terminates in a horizontal plane which is slightly below the horizontal plane of the top or bight of the feed roller. The right hand end of each lower splint may fall against the top edge of the plate 30 and when it does so the extreme right end of the splint comes into contact with the feed roller and the latter drives the splint by frictional contact through the bight between the roller and the plates 8 and delivers one splint in each row upon a positioning table 27.

Figure 15:
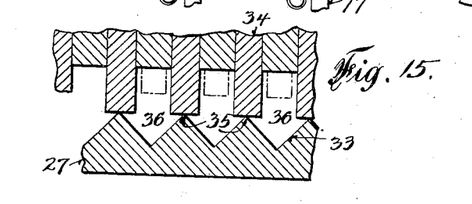
Figure 15 is a sectional view through the device for positioning the square splints with the splints shown in the position in which they enter the dies.
Figure 16:
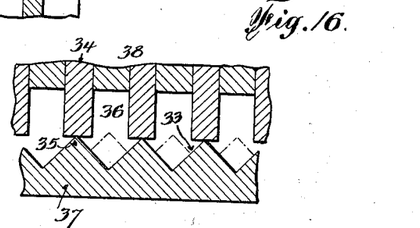
Figure 16 is a similar view showing the square splints as they fall into the angular pockets.

This table which is mounted by bolts 32 on the frame of the machine and extends across the machine between the propelling roller and the shaping or die rollers is provided, as shown in Figures 15 and 16, with a number of grooves or slots on its top surface of angular or V shape as shown at 33 in these figures. Each of these grooves receives a splint propelled by the propelling roller and preferably the distance between the propelling roller and the die rollers or, in other words, the front or back length of the table 27, is preferably longer than the length of the match splints, in order that the splints may be individually and completely dropped into one of the grooves 33.

The splint is propelled by the propelling roller between the extensions 34 of the plates 12 as shown in Figure 15, until they disengage from the feed roller, whereupon they drop into the slots 33 as shown in dotted lines in Figure 16. The bottom edges of the extensions 34 are in contact with the top edges 35 of the table so that the splints cannot move sidewise out of the channels 36 formed between these two members. As the splints drop to the dotted line position shown in Figure 16, they are by reason of their square cross section, turned into the position shown in this view, wherein two sides of each splint will rest against two of the inclined walls of the slots or grooves 33. This serves to position all the splints in one position, i. e., into the position in which they are to be fed between the die rollers.

There are shown two die rollers 37 and 38 mounted parallel to each other, and one over the other, so that the peripheries of these rollers are in contact to form a bight to the right of the positioning table 27 in Figures 9 and 10.

In the machine to which I have applied my invention, these rollers are of considerable length in order to handle ninety-six rows of splints at one time, and I have therefore divided the roller 37 lengthwise into sections A and B, and I have divided the upper roller 38 into sections C and D, so that a middle bearing may be provided for both rollers. I have shown the upper die roller 38 provided with semi-circular peripheral grooves 39 arranged at regular intervals along the length of the roller and in the construction referred to I have provided ninety-six of these grooves to correspond with the number of grooves in the positioning table, and therefore with the number of rows of splints delivered by the machine at a time. At the terminals of each of these semi-circular grooves there are small flat surfaces 40 the width of which is exaggerated in Figure 17.

Figure 17:
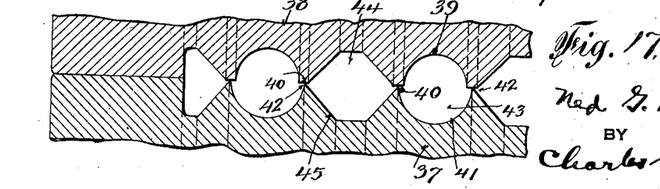
Figure 17 is a sectional view through portions of the dies.

The lower roller 37 is also provided with semi-circular grooves 41 but where these grooves terminate at the surface of the roller there are sharp cutting edges 42 provided which touch lightly or just clear the flat surfaces 40. Between the circular openings 43 formed by the opposed grooves in the upper and lower die members I have provided angularly shaped recesses 44 and 45 to form clearances for the cutting edges of the roller die member and to provide open spaces between the rollers into which any chips or shavings which are cut by the cutting edges 42 from the splints to clear from the die rollers.

The grooves 39 and 41 may be reversed, that is to say, the cutting edges 42 may be arranged on the upper die roller and the opposing surfaces 40 on the lower roller as the action of the roller dies will be the same in either case, but the description will follow the arrangement shown in the drawings. Each row of splints delivered by the feed roller onto the table 27 is fed between the die rollers and through one of the apertures 43.

I have stated that I prefer to make the distances between the feed roller and the die rollers slightly longer than the splints in order that each splint will drop onto the positioning table 27 before it starts through the die rollers and with such an arrangement a splint, after falling onto the table 27, is advanced into the bight of the die rollers by the next splint fed in the same channel or groove of the table 27.

Figures 7, 8:
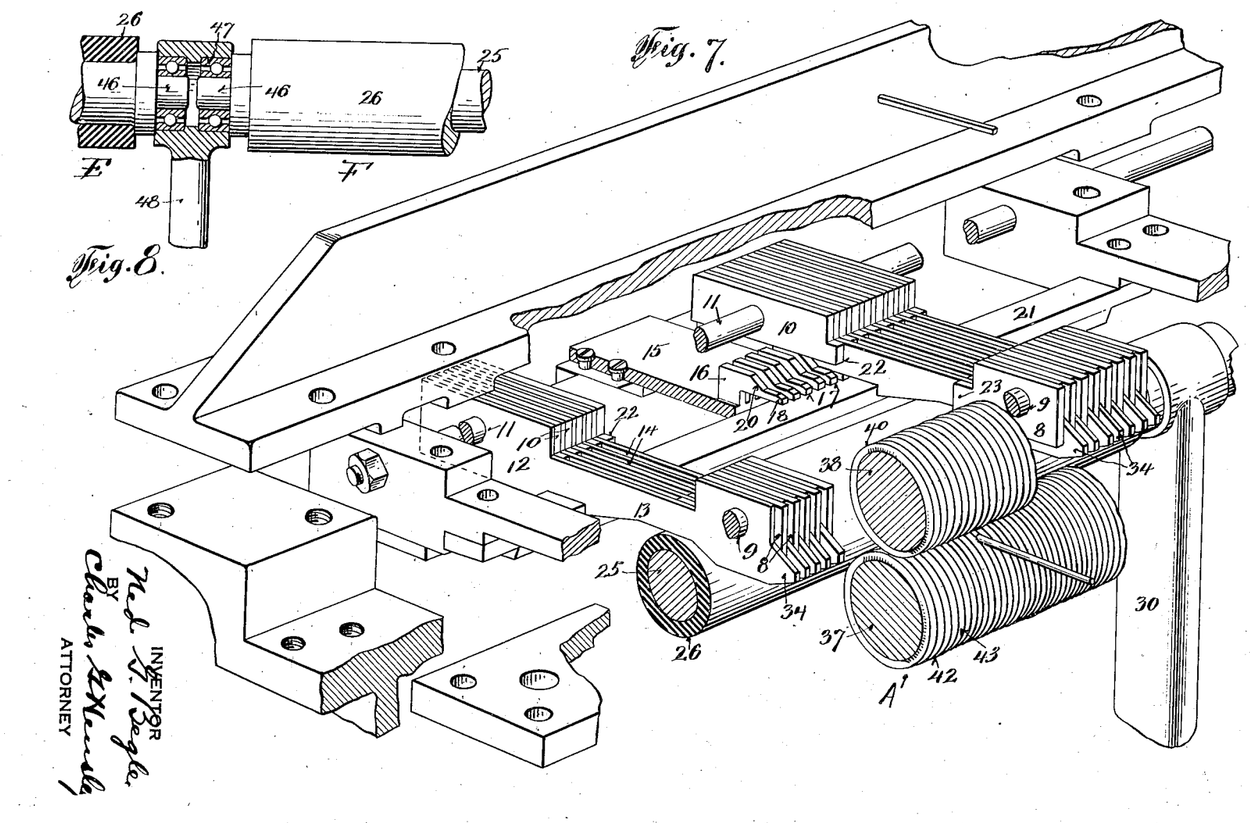
Figure 7 is a perspective view showing the dies, feed roller, and the splint guiding means.
Figure 8 is a detail view, partly in section, showing part of the feed roller and its bearings.

The feed roller is preferably divided into two sections E and F, as shown in Figure 8, in order to provide a central bearing, because of the length of this roller. In Figure 8 I have shown shafts 46 projecting from the ends of the two halves of the feed roller and these are mounted in ball bearings 47 arranged in sockets in an intermediate bracket 48 which is rigidly supported on the frame of the machine so that in addition to the end bearings for the feed roller there is an intermediate bearing.

Figure 13:
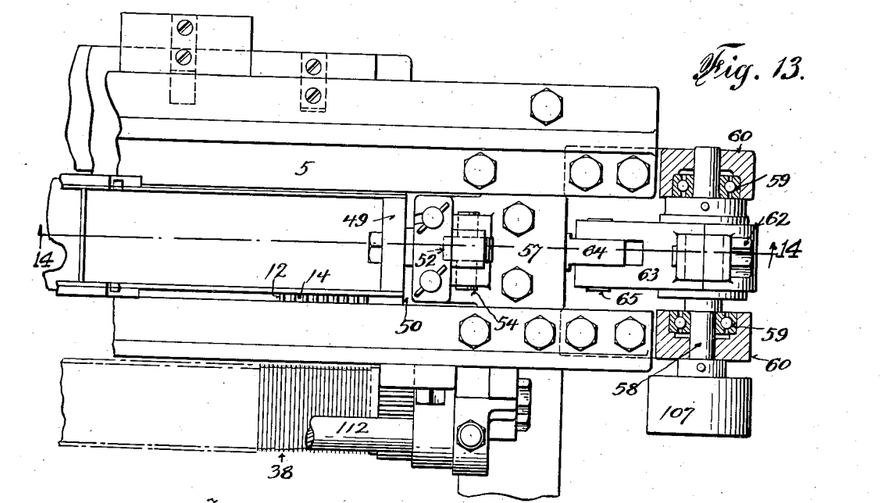
Figure 13 is a plan view of parts of the machine in which view some of the parts are broken away.
Figure 14:
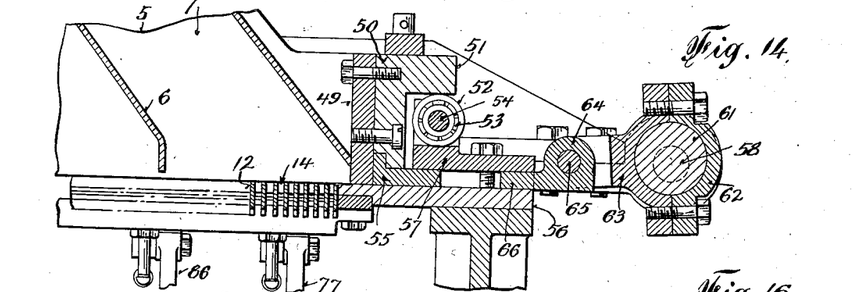
Figure 14 is a sectional view taken on the line 14—14 of Figure 13.

The end walls 49 of the hopper have attached thereto at each end an L shaped bar 50 one web of which lies against the wall 49 while the other web 51 projects to the right in Figures 13 and 14, so that the under surface of this projection rides on rollers 52 which are mounted by means of ball bearings 53 upon the shafts 54. These idler rollers support the entire hopper structure in a manner that permits the hopper to be moved slightly sidewise of the machine with very little force, in order to permit the splints to be shaken down in the hopper and fall into the slots 14.

There is another angular bar 55 which is held against the end wall 49 of the hopper by the overlapping joint of the bar 50. This second bar slides on the top face of the supporting wall 56 rigidly mounted on the frame of the machine, and it also slides under the bar 57 which supports the rollers 52 and serves to prevent the hopper from rising or tilting while it is being reciprocated.

There is a shaft 58 journaled by means of ball bearings 59 in the opposed sockets in the brackets 60 which are attached to the frame of the machine. There is mounted on this shaft an eccentric 61 which operates on the eccentric strap 62 to oscillate the arm 63 connected with the eccentric strap. This arm has a bifurcated end which straddles the eye 64 to which it is connected by the pin 65. The eye 64 is part of the bar 66 which reciprocates on the supporting plate 56 and below the bar 57 and it is connected with one end of the hopper structure. At each revolution of the shaft 58, the eccentric and its strap cause the hopper to slide sidewise of the machine on the supporting plate 56 for the purpose stated above. The various mechanisms for operating the movable parts described above are as follows: Power from any suitable source may be applied to the pulley 67 for driving the shaft 68. On this main shaft there is a gear 69 which meshes with and drives another and larger gear 70 which is mounted on a shaft 71 extending crosswise of the machine. On the latter shaft there is arranged a cam 72 with the periphery of which the anti-friction roller 73 arranged upon one arm of the angle lever 74 engages, so that this lever is rocked on the shaft 75 on which it is mounted.

I prefer to provide a plurality of cams 72 spaced at intervals along the shaft 71 and to provide a plurality of angle levers 74 all similar to each other and mounted on the shaft 75 at intervals to correspond with the intervals of the cams 72. The upwardly extending arms 77 of the angle levers have at their upper ends laterally extending studs 78 which are adapted to engage against the abutment members 79 to positively withdraw the driving member 15 which carries part of the drivers 16 to the left or to the position shown in Figure 4.

The driver bar 15 is moved in the opposite direction by means of the coiled springs 80 connected with the pin 81 on the driver bar and with the stationary pin 82 mounted on the under side of the beam 21. These springs not only move the driver bar 15 forwardly but they also serve to draw the lever 77, 76 and maintain its anti-friction roller 73 against the surface of the cam 72. It will be understood that the springs 80 are preferably duplicated at opposite ends of the machine and at other desired intervals.

There are other cams 83 mounted on the same shaft 71 as the cams 72 are mounted and they are of similar shape but disposed in angularly different positions to the cams 72. The rollers 84 arranged on the angle levers 85 which are similar to the first described levers 74, engage the several cams 83 so that these levers 85 are rocked in the same manner as the levers 74 but at different times. The upper arms 86 of the levers 85 also have pins 87 which engage abutment members 88 on the second driver bars 15 which carry certain of the drivers 16. The coiled springs 90 are attached to pins 91 on the abutment member 88 of the second driver bar 15 and at their opposite ends to posts on the under side of the beam 21 so that the second or under driver bar is moved to the right by a spring and to the left in Figures 2 and 4 by the angle levers 85, 86.

Figure 4:
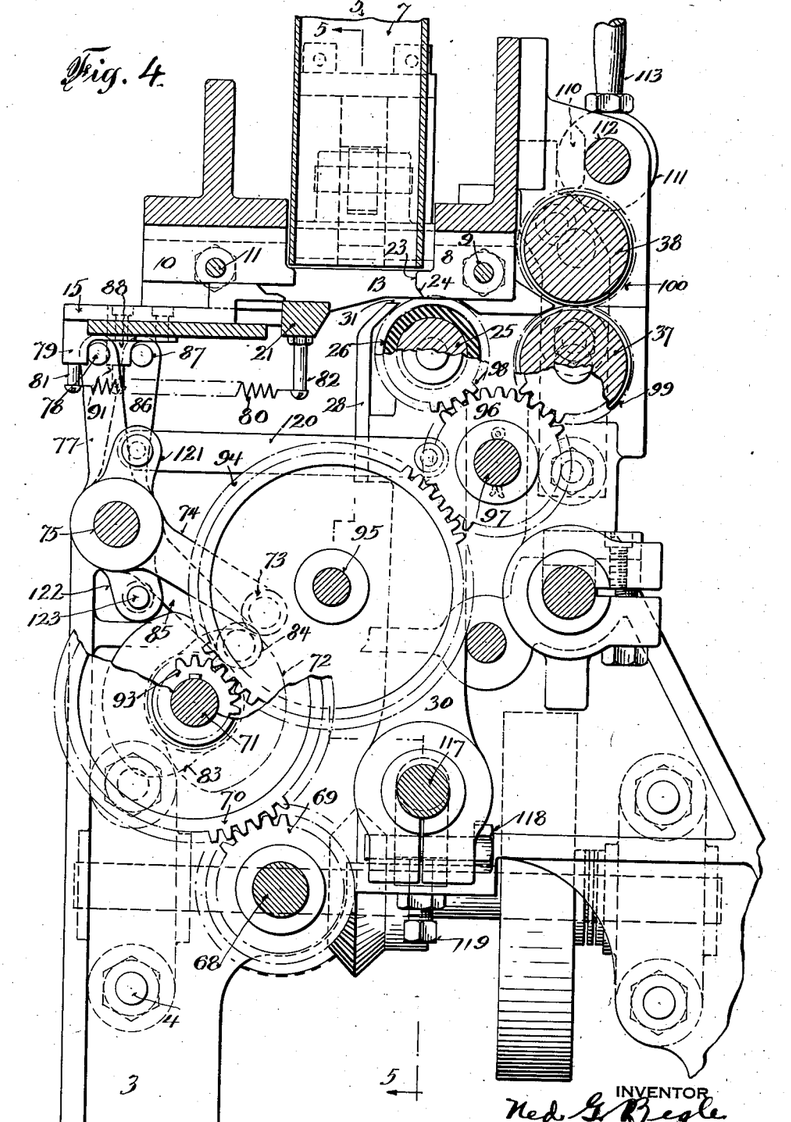
Figure 4 is a sectional view taken on the line 4—4 of Figure 1.
Figures 5, 6:
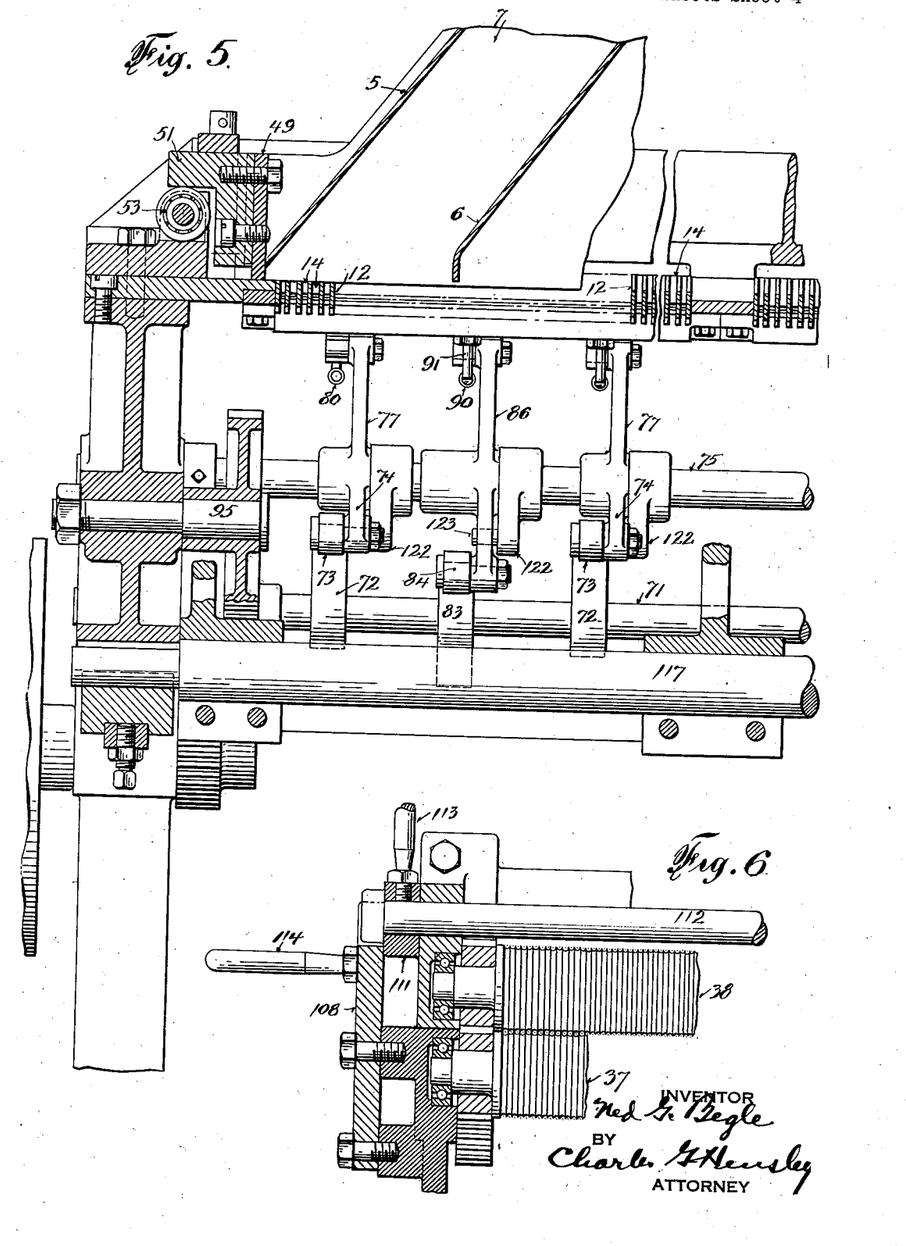
Figure 5 is a sectional view taken on the line 5—5 of Figure 4.
Figure 6 is a detail sectional view showing the dies and their bearings and the device for throwing forward one of the dies.

It will be apparent from what has been described that at each revolution of the shaft 71 the two sets of angle levers will be rocked but at slightly different periods, so that the drivers 16 carried by one driving bar will move forwardly or to the right in Figure 4 and advance certain of the splints into the bight of the friction feed roller and then the other driver bar will advance in the same manner and drive the remaining rows of splints into the bight of the feed roller.

I have employed a double set of angle levers for operating the drive bars in order to divide up the work to be done by these bars and in order that the splints in the ninety-six rows will not strike the feed roller at one time, but will be divided up into two groups each meeting the feed roller at slightly different intervals.

It will be understood that if the machine is constructed with narrower die rollers, it will not be necessary to use two driving bars and two sets of levers for operating them. It will be noted that both driving bars are moved to the right or in the direction to propel the splints by the springs which are resistible in their action, whereas the driving bars are returned or retracted by the positive action of the angle levers. This is deemed advisable in order that no parts of the machine will be damaged if for any reason the splints should become jammed and fail to feed.

On the shaft 71 on which the cams are mounted there is a small gear 93 which drives a larger gear 94 which is mounted on the shaft 95. This larger gear in turn meshes with and operates a gear 96 which is secured to a shaft 97. The latter gear meshes with and drives the gear 98 which is mounted on the shaft of the drive roller 25, from which it will be apparent that this roller is driven in a clockwise direction as viewed in Figure 4 through the action of the several gears all operated from the main shaft 68. The gear 96 also meshes with and drives the gear 99 which is mounted on the shaft of the lower die roller 27, so that the latter is driven in a clockwise direction in Figure 4.

On the shaft of the upper die roller 38 there is fixed a gear 100 which meshes with and is driven by the gear 99 on the shaft of the lower die roller.

The upper die roller is thus driven from the lower die roller but in an opposite direction, so that the adjacent surfaces of the two die rollers move in the same direction. Preferably, the several gears 94, 96, 98, 99 and 100 are duplicated at opposite ends of the machine as shown in Figure 1, in order that driving force may be applied to both sections of the die rollers.

Figure 1:
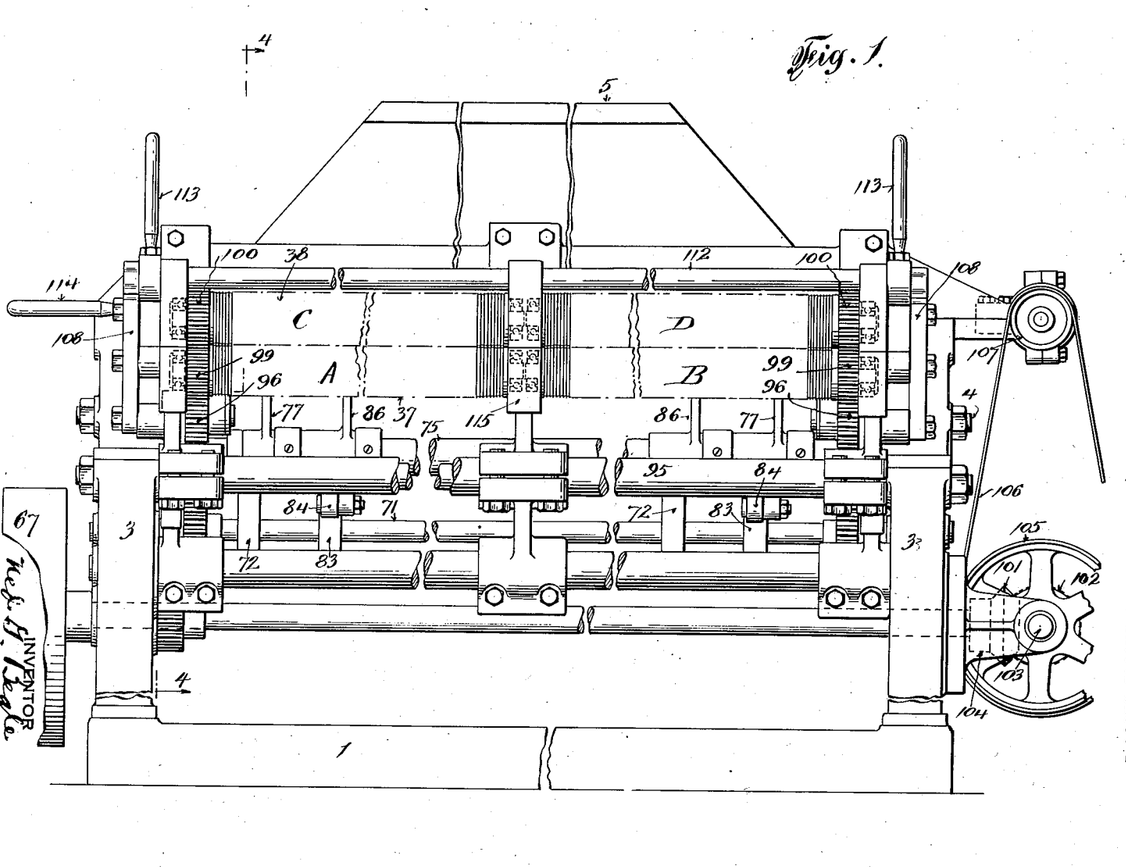
Figure 1 is a front elevation of a machine embodying my invention.

On the end of the shaft 68 at the opposite side of the machine to the pulley 67 I arrange a mitre gear 101 as shown in Figure 1, which meshes with and drives a mitre gear 102 fixed to the shaft 103 which has its bearings in brackets 104 in one of the end standards of the machine. There is a pulley 105 also mounted on this shaft 103 and it serves to operate through a belt 106 which also travels around the pulley 107 to drive the shaft 58 from which reciprocating force for the hopper is derived.

In order to permit a separation of the die rollers to clean out any shreds or pieces of splints, I have mounted the shaft of the lower die roller upon brackets 108 which are pivoted on the shaft 109 on a part of the end frames. When the die rollers are in operative position the upper ends of the pivotal brackets 108 are locked in position by means of locking members 110 carried by discs 111 on opposite ends of the shaft 112. These discs have handles 113 which may be grasped for the purpose of turning the discs to disengage the locking members 110 from the upper ends of the brackets 108 so that the latter, together with the lower die roller may be swung outwardly into the position shown in Figure 3, in order to separate the lower die roller from the upper one and to provide space into which the operator may reach for any accumulated material between the die rollers or to clean the latter or for any other purpose.

Figures 2, 3:
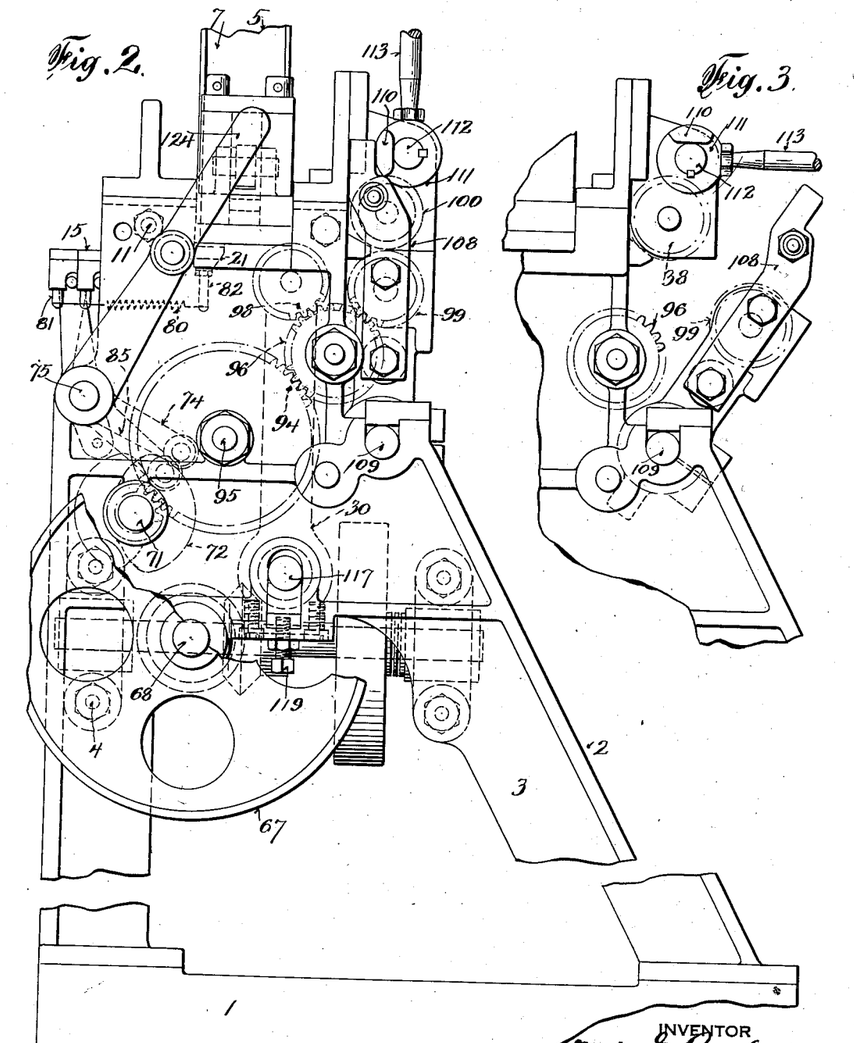
Figure 2 is a side elevation looking at the left side as viewed in Figure 1, with parts broken away.
Figure 3 is an enlarged detail view showing the device for throwing one of the dies forward to remove any material which may accumulate around the dies.

I have also shown a handle 114 on one of the swinging brackets 108 which may be grasped to facilitate swinging the lower roller into the position shown in Figure 3. The intermediate bracket 115 shown in Figure 1 will be swung outwardly whenever the end brackets 108 are swung.

The drive roller 25 is mounted on the upper ends of the supporting posts 30 and in order to provide for adjusting the drive roller to take up for reduction of its diameter as the surface of the rubber covering may wear, I have shown in Figures 3 and 4 the lower ends of the posts 30 mounted upon a shaft 117 which permits the posts and the drive roller to be swung slightly anticlockwise as viewed in Figure 4, in order to permit any accumulating material to be cleaned out at the top of the feed roller. The lower ends of the posts 30 are split and the split portions are adapted to be tightened by means of the bolts 118 upon the shaft 117 in order that there shall be no play as between the posts and this shaft.

The shaft 117 may be adjusted vertically a slight extent by means of the screws 119 which press upwardly on the bearing blocks in which the shaft 117 is journaled, so that as the surface of the feed roller 25 wears down the shaft 117 may be jacked up slightly so that the spacing between the periphery of the feed roller and the bottom edges of the plates 8 may be the same as before the wear has taken place.

There are links 120 each having one end pivotally connected to one of the posts 30 which carry the feed roller, and the other ends of these links are pivotally connected to the lever arms 121 free on the shaft 75. There are other arms 122 associated with the lever arms 121 and these have laterally extending studs 123 which are adapted to engage with the lower arms 85, 74 of both sets of angle levers.

The object of this is that when the posts 30 are swung to the left in Figure 4 upon the shaft 117 to move the propelling roller out of operative position, the links 120 will rock the several levers 121, 122 so that the pins 123 engaging the lower ends of the angle levers will rock all of these anticlockwise in Figure 4 and thus retract both driver bars 15, 89 and prevent them from driving forward any splints which may be in the lowermost positions.

I have provided means for manually retracting both driver bars in case the machine becomes clogged in order to prevent damage before the machine can be stopped. For this purpose I have provided a lever arm 124 which is adapted to be gripped by hand and when rocked to the left in Figure 2 it rocks the shaft 75 to which it is connected and as this shaft carries all of the angle levers both driving bars will be moved to the left and their rollers held off the cams 72, 83.

*Operation*

A quantity of splints will be supplied to the hopper and the splints which are at the bottom of the hopper rest partly on the top edges of the plates 12 while others pass through the slots 14 between these plates and the lowermost splints rest partly on the beam 21 and partly on the upper edge of the plate 28. This will be the condition in each of the slots 14, in the construction which I have illustrated. The hopper will be reciprocated laterally of the machine at each revolution of the shaft 58 for the purpose of shaking the splints down in the hopper and for the purpose of moving the splints across the plates 12 so that some of the splints will fall into any of the slots 14 which are not entirely filled. This action, therefore, keeps the slots 14 supplied with splints as fast as they are taken away from below.

It will be observed that the splints in the lower part of the slots 14 lie in echelon relation as shown in Figures 9 and 10.

The driver bars 15 will move from the left to the right in Figure 9 under the action of their springs 80 and 90 respectively but slightly in advance of each other so that the lowermost splints in one-half of the slots 14 will be driven into the bight of the propelling roller and then the splints in the other half of the slots 14 will be driven into the bight of the propelling roller after the first group has been propelled onto the separating table 27.

The cams 72 and 83 are so timed in relation to each other that the driver bars 15 move to the right one in advance of the other, while the lever arms 86 and 77 move to the right under the action of their respective springs and under the control of the cams 72 and 83. When the higher portions of the cams operate on the rollers 73 and 84 the lever arms 86 and 77 are moved to the left in Figures 4 and 9 and in this manner the driver bars 15 are positively retracted but at different times. Each time one of the driver bars 15 moves to the right the drivers 16 carried by these driver bars slide on the top surface of the beam 21 and the edge portion 17 of each driver engages the rear end of the splint lying in one of the slots 14, and as the driver moves to the right this lower splint moves to the right so that its opposite or forward end is moved into the bight between the driving roller 25 and the plates 8.

As the propelling roller is turning very rapidly it serves to propel the single splint moved out of each slot 14 forwardly, or to the right in Figure 9, and discharges each splint in one of the channels 36 so that as the rear end of the splint leaves the propelling roller that splint will drop onto the inclined surfaces 33 formed in the positioning table 27.

The next splint which is fed forwardly by the propelling roller in any particular row will push the splint which is lying in a corresponding groove 33 of the positioning table and advance that splint sufficiently to move its forward end into the bight of the rollers 37 and 38 and from then on the splint is propelled by these latter rollers until discharged from the machine fully treated in the manner herein set forth.

As the drivers 16 go forwardly in the above-described operation the splints next above the ones which are being pushed by the ends 17 will rest on the flat surfaces 19 and they will be pushed slightly along against the inclined surfaces 24 of the plates 8 and the splints next above this will also be slightly advanced by the inclined surfaces 20 so that there is always one or more splints above the ones which are being fed, lying in echelon to facilitate the separating action.

The top edge of the plate 28 prevents the splints, while resting on the beam 21 at one end, from dropping down and engaging the propelling roller at an angle which might cause breakage of splints or cause the ends of the splints to dig into the propelling roller. However, this plate does not prevent the splints from engaging the top of the propelling roller when they are moved forward by the drivers.

The splints are all positioned in the same relation in the slots 33 of the table 27 so that they are all presented alike to the die rollers. During one cycle of operation of the machine one splint will enter each of the substantially circular grooves 43 formed by the co-operating grooves 39 and 41 of the upper and lower die rollers.

One of the angular edges of each splint will be pressed against the central portion of the arched surface 39 and another angular edge will be pressed against the central portion of the groove 41 and the dimensions are such that these two angular edges will be compressed to form opposite portions of the splints into circular form. Two of the angular edges of the splints lying diagonally opposite each other will be partly compressed on horizontally opposite sides of the grooves 39 and 41 and portions of these angular edges of the splints will be trimmed off by the knife edges 42 acting against the surfaces 40. In this manner the splints are both compressed and trimmed although the trimming takes place opposite only two of the angular edges of the splint, whereas compression takes place substantially all around or at the four angular edges of the splints.

The pieces of fibre which are trimmed off by the cutting edges 42 may fall into the recesses 44, 45 between the upper and lower rollers and discharge freely therefrom at the front of the machine.

It will be seen from the above that the splints are propelled through the apertures 43 by the propelling action of the upper and lower rollers 38 and 37 which at any time affect only a small portion of each splint and as the propelling force is a rolling action progressing along the splint, there is no stress upon the splint other than the compressing and cutting stress, so that even if the grain of any given splint is not exactly straight, there will be nothing to break up the splint and clog the machine. Furthermore, if the splint is not exactly straight, it will pass through the roller dies without injury or breakage and it will be reduced to the rounded or circular form notwithstanding the fact that it is not exactly straight. There is, therefore, no chance of splints which may become bent or warped, clogging the machine or causing injury thereto.

If for any reason it becomes necessary to suddenly stop the drivers from operating, it is only necessary to grasp the lever 124 and throw it to the left in Figure 2, thereby rocking the shaft 75 and retracting both lever arms 86 and 77 and thus retracting both driver bars 15 and 89 to hold the drivers 16 in retracted position so that no splints will be driven into the bight of the propelling roller. In the meantime the operator may stop the machine if that is necessary. The lever 124 may also be held over to allow the hopper to be oscillated several times to fill up the slots 14 with splints before the drivers are set into operation. Whenever it is desired to swing the propelling roller out of active position, the posts 116 may be swung to the left in Figure 4, pivoting on the shaft 117, and this will also retract the lever arms 86 and 77 if they are not already retracted, because the link 120 will act on the lever arms 121 and the pins 123 will lift the lever arms 85 and 74.

If at any time the propelling roller becomes worn, the shaft 117 which carries the posts 116 may be raised by turning the bolts 119 to raise the shaft 117 thus raising the propelling roller in relation to the plates 8. If at any time it is necessary to obtain access to the space behind the rollers 37 to 38, it is only necessary to swing the handles 113 into the position shown in Figure 3, whereupon the brackets 108 which carry the lower roller 37 may be swung forwardly as shown in this view.

From the above it will be apparent that I have provided a machine for operating at high speed upon a great number of splints to reduce them to rounded or circular form partially by compression and partially by a trimming action and that instead of driving the splints through an aperture in a die and thereby tending to split the splints, I employ a roller action through the operation of the roller dies which will not injure the splints and which will not cause breakage or clogging of the machine.

Having described my invention, what I claim is:

1. A machine for converting splints of polygonal cross section to rounded or circular splints including co-operating rollers adapted to propel the splints between them, and having opposed rounded grooves through which the splints are adapted to travel and in which the splints are compressed to reduce them from rectangular cross section to rounded or circular cross section, the distance across the opposing grooves being less than the diagonal distance across the polygonal splints, one of said rollers having sharp cutting edges at the sides of the grooves, and the other having flat surfaces opposed to said cutting edges, whereby said rollers will trim angular edges from the splints, and means for feeding splints of polygonal cross section into the bight of said rollers.

2. A machine for converting splints of polygonal cross section to rounded or circular splints, including co-operating rollers adapted to propel splints between them, said rollers having opposed, half-round peripheral grooves through which the splints are adapted to travel and in which some of the corners of the splints are adapted to be compressed, one of said rollers having cutting edges at each side of its peripheral grooves and the other having surfaces opposed to said cutting edges whereby certain of the corners of the splints will be cut off by said cutting edges, and means for feeding splints of polygonal cross section into the bight of said rollers.

3. A machine for converting splints of polygonal cross section to rounded or circular splints, including co-operating rollers adapted to propel splints between them, said rollers having semi-circular peripheral grooves through which the splints are adapted to travel and in which the splints are compressed to reduce them from rectangular cross section to rounded or circular cross section, the distance across the opposing grooves being less than the diagonal distance across the polygonal splints, one of said rollers having cutting edges at the sides of its peripheral grooves, and the other roller having surfaces co-operating with said cutting edges, means for feeding splints of polygonal cross section into the bight of said rollers, said rollers having other peripheral grooves alternating with said first mentioned grooves into which the material trimmed off by said cutting edges may fall.

4. A machine for converting splints of polygonal cross section to rounded or circular splints, including co-operating rollers adapted to propel splints between them and having opposed rounded grooves through which the splints are adapted to travel and in which the splints are compressed to reduce them from rectangular cross section to rounded or circular cross section, the distance across the opposing grooves being less than the diagonal distance across the polygonal splints, and means for feeding splints of polygonal cross section into the bight of said rollers, including a support on which the splints are adapted to rest, said support having grooves provided with angular sides which will cause all of the splints to lie in similar positions before entering the bight of said rollers.

5. A machine for converting splints of polygonal cross section to rounded or circular splints, including co-operating rollers adapted to propel splints between them and having opposed rounded grooves through which the splints are adapted to travel and in which the splints are compressed to reduce them from rectangular cross section to rounded or circular cross section, the distance across the opposing grooves being less than the diagonal distance across the polygonal splints, and means for feeding splints of polygonal cross section into the bight of said rollers, including a support having grooves provided with flat walls disposed in V shape, in which said splints are adapted to rest and to be positioned preparatory to entering the bight of said rollers.

6. A machine for converting splints of polygonal cross section to rounded or circular splints, including co-operating rollers adapted to propel splints between them and having opposed rounded grooves through which the splints are adapted to travel and in which the splints are compressed to reduce them from rectangular cross section to rounded or circular cross section, the distance across the opposing grooves being less than the diagonal distance across the polygonal splints, means for feeding splints of polygonal cross section into the bight of said rollers including a support having grooves provided with flat walls disposed in V shape, in which said splints are adapted to rest and to be positioned preparatory to entering the bight of said rollers said latter grooves being arranged in a plurality of rows in a common plane, and a feed roller for propelling said splints onto and across said support.

7. In a machine for handling splints the combination of a hopper, a series of plates disposed in spaced vertical planes below the hopper to provide slots through which the splints pass, other plates disposed in vertical planes between said first mentioned plates and arranged to abut the forward ends of the splints while in said slots, still other plates disposed in vertical planes and arranged to engage the rear ends of said splints while in said slots, said several plates being assembled face to face whereby said second and said third mentioned plates form spaces between said first mentioned plates.

8. A machine for converting splints of polygonal cross section to rounded or circular splints, including co-operating rollers adapted to propel the splints between them, and having opposed grooves in which the splints are adapted to be compressed, a hopper, means below the hopper forming vertical slots through which the splints travel, a roller for propelling the lowermost splints toward said co-operating rollers, a driver engaging the rear ends of the splints and adapted to drive them into operative engagement with said feeding roller, spring means for moving the driver in a direction to propel the splints and cam means for retracting said driver.

9. A machine for converting splints of polygonal cross section to rounded or circular splints, including co-operating rollers adapted to propel the splints between them and having opposed grooves in which the splints are adapted to be compressed, a hopper, means below the hopper forming vertical slots through which the splints travel, a roller for propelling the lowermost splints toward said co-operating rollers, a plurality of drivers engaging the rear ends of the splints and adapted to drive them into operating engagement with said feeding roller, and means for operating certain of said drivers to advance the splints, and means for operating other of said drivers in different timed relation to said first mentioned drivers to propel others of said splints towards said feed roller.

10. A machine for converting splints of polygonal cross section to rounded or circular splints, including co-operating rollers adapted to propel splints between them and having opposed grooves in which the splints are adapted to be compressed, a hopper, means below the hopper forming slots through which the splints travel, a roller for propelling the splints from below said hopper towards said first mentioned rollers, a plurality of sets of drivers for engaging the rear ends of the splints to drive them into co-operative relation with said feed roller, springs for drawing said drivers in one direction, a shaft having lever arms thereon, means for retracting said drivers, including a cam shaft and cams thereon, and lever arms on said first shaft actuated at different time periods by said cams to retract different sets of drivers at different time periods.

11. A machine for converting splints of polygonal cross section to rounded or circular splints, including co-operating rollers adapted to propel splints between them and having opposed grooves in which the splints are adapted to be compressed, a hopper, means below the hopper forming vertical slots through which the splints travel, a roller for propelling the lowermost splints toward said co-operating rollers, a shaft, upright posts mounted thereon and carrying said propelling roller, drivers for engaging the rear ends of the splints to move them into co-operative relation with the feed roller, means for operating said drivers, and interconnecting means between the propelling roller support and said driver operating means whereby when said propelling roller is moved out of operative position the drivers will be automatically retracted.

12. A machine for converting splints of polygonal cross section to rounded or circular splints, including co-operating rollers adapted to propel splints between them and having opposed grooves in which the splints are adapted to be compressed, a hopper, means below the hopper forming vertical slots through which the splints travel, a roller for propelling the lowermost splints toward said co-operating rollers, drivers for engaging the rear ends of the splints to move the splints into co-operative relation with the propelling roller, a shaft having lever arms thereon for retracting said drivers and manually operated means for rocking said shaft to throw said drivers out of operation independently of the operation of said rollers.

NED G. BEGLE.